US008629745B2

(12) United States Patent
Sturman et al.

(10) Patent No.: US 8,629,745 B2
(45) Date of Patent: Jan. 14, 2014

(54) PRESSURE BALANCED SPOOL POPPET VALVES WITH PRINTED ACTUATOR COILS

(75) Inventors: Oded Eddie Sturman, Woodland Park, CO (US); Steven E. Massey, Woodland Park, CO (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 172 days.

(21) Appl. No.: 12/837,172

(22) Filed: Jul. 15, 2010

(65) Prior Publication Data

US 2010/0277265 A1 Nov. 4, 2010

Related U.S. Application Data

(62) Division of application No. 11/601,476, filed on Nov. 16, 2006, now abandoned.

(60) Provisional application No. 60/738,859, filed on Nov. 21, 2005.

(51) Int. Cl.
*H01F 7/10* (2006.01)
(52) U.S. Cl.
USPC .......................................................... 335/250
(58) Field of Classification Search
None
See application file for complete search history.

(56) References Cited

U.S. PATENT DOCUMENTS

| 2,373,537 | A | 4/1945 | Camfield |
| 2,751,923 | A | 6/1956 | Towler et al. |
| 2,837,148 | A | 6/1958 | Jay |
| 2,971,090 | A | 2/1961 | Piet et al. |
| 3,031,235 | A | 4/1962 | Schwartz |
| 3,036,598 | A | 5/1962 | Smith et al. |
| 3,202,182 | A | 8/1965 | Haviland |
| 3,339,586 | A | 9/1967 | Tenkku et al. |
| 3,415,284 | A | 12/1968 | Stampfli |
| 3,527,253 | A | 9/1970 | Harpman |
| 3,646,969 | A | 3/1972 | Stampfli |
| 3,683,239 | A | 8/1972 | Sturman |
| 3,741,247 | A | 6/1973 | Kaemmer |
| 3,743,898 | A | 7/1973 | Sturman |
| 3,768,517 | A | 10/1973 | Pauliukonis |
| 3,776,275 | A | 12/1973 | Updike |
| 3,815,634 | A | 6/1974 | Dowdall et al. |
| 3,910,314 | A | 10/1975 | Nicholson |

(Continued)

FOREIGN PATENT DOCUMENTS

| DE | 1803578 | 7/1970 |
| EP | 0621426 | 10/1994 |

(Continued)

OTHER PUBLICATIONS

"International Search Report and Written Opinion of the International Searching Authority Dated Jun. 11, 2007", International Application No. PCT/US2006/044901.

(Continued)

*Primary Examiner* — Alexander Talpalatski
(74) *Attorney, Agent, or Firm* — Blakely Sokoloff Taylor & Zafman LLP

(57) ABSTRACT

Actuators with printed actuator coils facilitate efficient manufacturing and reliable operation. The printed actuator coils are in coil segments on multiple layers on a multilayer printed circuit board, which may contain a printed actuator coil for one or more additional actuators, and/or electronic circuitry, such, as may be used for control of the actuator(s).

9 Claims, 3 Drawing Sheets

(56) References Cited

U.S. PATENT DOCUMENTS

| | | | |
|---|---|---|---|
| 3,955,597 A | 5/1976 | Oneyama et al. | |
| 3,990,468 A | 11/1976 | Arvin et al. | |
| 4,108,419 A | 8/1978 | Sturman et al. | |
| 4,175,587 A | 11/1979 | Chadwick et al. | |
| 4,332,368 A | 6/1982 | Woloszczuk | |
| 4,641,118 A | 2/1987 | Hirose et al. | |
| 4,815,699 A | 3/1989 | Mueller | |
| 4,823,825 A | 4/1989 | Buchl | |
| 4,880,033 A | 11/1989 | Neff | |
| 4,898,360 A * | 2/1990 | VonHayn et al. | 251/129.01 |
| 4,961,560 A | 10/1990 | Ellett | |
| 5,144,982 A * | 9/1992 | Willbanks | 137/625.5 |
| 5,193,781 A | 3/1993 | Willbanks | |
| 5,207,059 A | 5/1993 | Schexnayder | |
| 5,211,198 A | 5/1993 | Tinholt | |
| 5,351,601 A | 10/1994 | Zeuner et al. | |
| 5,396,926 A | 3/1995 | Pataki et al. | |
| 5,460,329 A | 10/1995 | Sturman | |
| 5,463,996 A | 11/1995 | Maley et al. | |
| 5,485,957 A | 1/1996 | Sturman | |
| 5,497,806 A | 3/1996 | Swank et al. | |
| 5,640,987 A | 6/1997 | Sturman | |
| 5,673,669 A | 10/1997 | Maley et al. | |
| 5,697,342 A | 12/1997 | Anderson et al. | |
| 5,845,672 A * | 12/1998 | Reuter et al. | 137/315.03 |
| 5,918,635 A | 7/1999 | Wang et al. | |
| 5,970,956 A | 10/1999 | Sturman | |
| 6,012,644 A | 1/2000 | Sturman et al. | |
| 6,038,957 A | 3/2000 | Ertmann et al. | |
| 6,082,332 A | 7/2000 | Hefler et al. | |
| 6,085,991 A | 7/2000 | Sturman | |
| 6,103,199 A * | 8/2000 | Bjornson et al. | 422/503 |
| 6,145,806 A | 11/2000 | Dettmann | |
| 6,161,770 A | 12/2000 | Sturman | |
| 6,170,524 B1 | 1/2001 | Gray, Jr. | |
| 6,174,219 B1 | 1/2001 | Mathews | |
| 6,257,499 B1 | 7/2001 | Sturman | |
| 6,360,728 B1 | 3/2002 | Sturman | |
| 6,371,382 B1 | 4/2002 | Niethammer et al. | |
| 6,425,375 B1 | 7/2002 | Hefler et al. | |
| 6,616,249 B2 * | 9/2003 | Han | 303/119.3 |
| 6,655,602 B2 | 12/2003 | Shafer et al. | |
| 6,668,861 B2 | 12/2003 | Williams | |
| 6,715,694 B2 | 4/2004 | Gebhardt | |
| 6,739,293 B2 | 5/2004 | Turner et al. | |
| 6,806,793 B2 | 10/2004 | Bhatia et al. | |
| 6,837,451 B2 | 1/2005 | Rodriguez-Amaya et al. | |
| 6,918,409 B1 | 7/2005 | Parker | |
| 6,935,706 B2 * | 8/2005 | Jocham | 303/119.2 |
| 6,946,937 B2 * | 9/2005 | Donce | 335/282 |
| 6,957,664 B2 | 10/2005 | Suilmann et al. | |
| 7,011,113 B2 * | 3/2006 | Gandrud | 137/884 |
| 7,032,574 B2 | 4/2006 | Sturman | |
| 7,247,778 B2 * | 7/2007 | Chase et al. | 84/6 |
| 2002/0029765 A1 | 3/2002 | Giavi et al. | |
| 2002/0167384 A1 * | 11/2002 | Paris | 336/115 |
| 2004/0149264 A1 | 8/2004 | Pecheny et al. | |
| 2004/0188537 A1 | 9/2004 | Sturman | |
| 2004/0238657 A1 | 12/2004 | Sturman | |
| 2005/0194052 A1 * | 9/2005 | Gandrud | 137/884 |
| 2006/0157581 A1 | 7/2006 | Kiss et al. | |

FOREIGN PATENT DOCUMENTS

| | | |
|---|---|---|
| FR | 2180789 | 11/1973 |
| FR | 2354499 | 1/1978 |
| GB | 631750 | 11/1949 |
| GB | 2352798 | 2/2001 |
| JP | 2002-351306 | 12/2002 |

OTHER PUBLICATIONS

Godlove, Terry F., et al., "Printed-Circuit Quadrupole Design", *Proceedings of the 1995 Particle Accelerator Conference*, vol. 4, May 1-5, 1995, pp. 2117-2119.

* cited by examiner

PRESSURE BALANCED SPOOL POPPET VALVES WITH PRINTED ACTUATOR COILS

CROSS-REFERENCE TO RELATED APPLICATION

This application is a divisional of U.S. patent application Ser. No. 11/601,476 filed Nov. 16, 2006 which claims the benefit of U.S. Provisional Patent Application No. 60/738,859 filed Nov. 21, 2005.

BACKGROUND OF THE INVENTION

1. Field of the Invention

The present invention relates to the field of valves, and systems using a plurality of solenoid actuators.

2. Prior Art

Embodiments of the present invention provide improved devices for fluid control in various applications. Typical examples include the control of a high pressure fuel injector, and hydraulic engine valve actuation systems. Two-way poppet valves (open and closed) are often used due to their low leakage characteristics. In many applications, it is highly desirable to use a three-way valve for improved performance and control, but this is difficult due to a three-way valve's inability to pressure balance completely unless it is a spool valve, which leaks excessively. For purposes of this disclosure, a three-way valve will be described as a valve coupling a source (S) passage to a control (C) passage or coupling the control passage to a vent (V), though other port identifications may be more appropriate depending on the use of the three-way valve.

The choices for a three-way valve are:

Spool valve. A spool valve can create the required hydraulic paths, but while in either position (S-C or C-V) the valve has a very short leak (seal) path from a high-pressure area to a vented area, which can lead to high system parasitic losses. This valve can be designed to have a hydraulic short circuit (momentarily coupling of source and vent when transitioning from one position to the other) or not, depending on the application. The advantages are primarily in its pressure balance, thereby requiring very low actuation forces, and in the ability to be designed to avoid the short circuit.

Three-way hard-seat valve (Poppet). This type of valve can have no leakage in either position, but when the valve is transitioning from one position to the other, there necessarily exists a direct flow path between the source and the vent that could lead to large losses of energy and system noise. This type of valve cannot be completely pressure balanced, and therefore requires greater actuating forces than a typical pressure balanced spool valve.

Two two-way hard-seat valves (Poppet). This option has no leakage and can have a direct flow path between the source and the vent or not, depending on control of the system. The disadvantage of this system is that twice as many control valves are needed to achieve three-way control, adding system and control complexity, and further requiring more room to package.

Thus the current choices and their disadvantages are:
Spool Valve: High static leakage.
Three-way hard-seat valve: High actuating force requirements (due to pressure imbalance) and short circuit loss.
Two, two-way hard seat valves: Cost and complexity.

Solenoid actuators for valves of various types are also well known. Such actuators may be single coil spring return, with or without magnetic latching or double coil, with or without magnetic latching (see U.S. Pat. Nos. 3,743,898 and 5,640,987). However configured, solenoid actuators generally have a relatively simple mechanical configuration, with the solenoid coils being relatively inexpensive to wind. However, in certain applications, the number of solenoid actuated valves preferably used may be relatively large, giving rise to quite a substantial wiring problem. Superimposed on this in certain applications is a combination of heat and vibration that can cause premature wiring failure, and thus possibly giving rise to unsatisfactory reliability of the system. One such application to which preferred embodiments of the present invention are directed is in diesel engines, and more specifically, to hydraulic engine valve actuation systems as are currently in development, and diesel engine fuel injection systems, as well as fuel air cells incorporating both hydraulic engine valve actuation and fuel injection in a single assembly for each engine cylinder. Because most diesel engines are multiple cylinder engines, such as 6 and 8 cylinder engines, each having intake valves, exhaust valves and a fuel injector, all three of which must be independently controlled for each cylinder, and preferably for greater flexibility each engine valve actuator and each fuel injector will have more than one solenoid valve, the number of solenoid valves preferably used in a multi-cylinder engine can be quite substantial. Accordingly, wiring of the individual solenoid coils to a harness for connection to a control box would be complicated and expensive and may not have the reliability inherent in the rest of the diesel engine.

DETAILED DESCRIPTION OF THE PREFERRED EMBODIMENTS

Figure 1:
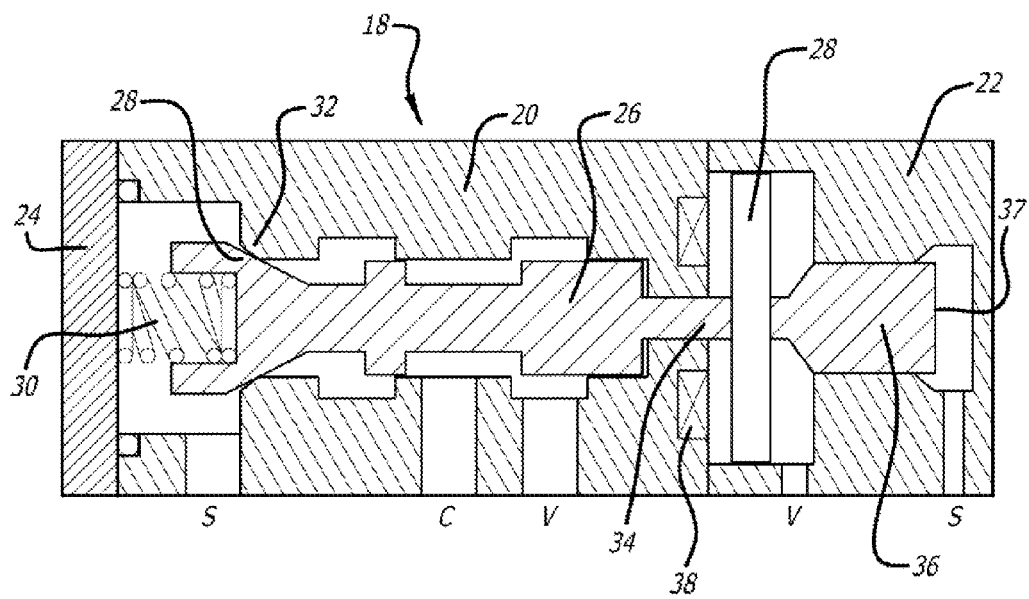
FIG. 1 is a cross section of one embodiment of pressure balanced spool poppet valve in accordance with the present invention.

First referring to FIG. 1, a cross-section of a spool poppet valve in accordance with an embodiment of the present invention may be seen. The valve shown is a three-way valve, in that it may connect a control port C to a supply port S or to a vent port V. The valve includes a housing 20 and cap 22, both of which are of magnetic materials, and an end cap 24, which may or may not be fabricated of a magnetic material. Located within the housing 20 is a spool 26 having a poppet valve 28 at the left end thereof, with a coil spring 30 encouraging the spool and poppet valve to the right position, as shown. In this position, the control port C is coupled to the vent port V, with the poppet valve being firmly seated on seat 32 on the housing to seal the high pressure fluid in the source port S from the control port C.

At the right end of spool 26 is a magnetic armature 28 urged against end 34 of the spool by a pressure balance piston 36, the right end of which is also subjected to the fluid pressure of the supply S. The diameter of the pressure balance piston 36 is the same as the outer diameter of the spool 26, thus substantially equal to the inner diameter of the housing 20 and cap 22. This, coupled with the fact that the angle of the valve seat 32 is slightly greater than the angle of the poppet valve 28 so that the poppet valve seals on the edge of the bore in the housing 20, means that the spool poppet valve is pressure balanced, the pressure of the supply S on the poppet valve 28 acting over the same area as the fluid in supply S acting on the end of pressure balance piston 36.

When a current is passed through coil 38, the armature 28 is attracted to the left, overcoming the force of spring 30 to move the spool to a left-most position when the armature 28 is attracted flat against the end of housing 20. In this position, a magnetic circuit is established through housing 20 and armature 28 that has a substantially zero air gap. Thus in this position, the armature 28 may be retained by residual magnetism in the housing 20 and armature 28, or alternatively, by a small holding current in coil 38, depending on the relative forces between spring 30 and the holding force of the residual magnetism. Obviously, when the spool moves to the left position, in this embodiment the coupling from the control C to the vent V is first discontinued as poppet valve opens, and then coupling from the control port C to the supply port S is opened by the spool. Alternatively, if one wanted, one could simultaneously close one port and open the other, or as a further alternative, open the coupling between the control port C and the supply port S before closing the coupling between the control port C and the vent, though usually this is undesirable because of the loss of energy by the momentary coupling of the supply port S directly to the vent port V.

An advantage of the spool poppet valve of FIG. 1 is the fact that when the poppet valve is closed, the leakage characteristic of a spool valve is grossly reduced. This is of particular advantage in applications where the fluid pressure in the supply S is quite high and/or when the valve is used in an application where the valve is used to couple the high pressure fluid in supply port S to the control port C only a relatively small percentage of the overall time of use of the valve. By way of specific example, a valve in accordance with FIG. 1 might be used to control the fluid pressure over an intensifier in an intensifier-type fuel injector. In such an application, in a four-cycle diesel engine, the control port C would be coupled to the supply port S over a crankshaft angle of perhaps 90° or less during each 720° rotation of the crankshaft. Thus in such applications, the leakage from supply to vent is grossly reduced by the poppet valve. In that regard, when the valve is actuated, the supply pressure in supply port S will be communicated to the control port C, with leakage past the spool to the vent port V, though as stated before, that will occur only for a relatively small percentage of the use of the valve. There will, of course, also be leakage from the supply port S past the pressure balance piston 36 to vent V, although because of the length of the leakage area, this leakage is also grossly reduced in comparison to that of a relatively short stroke ordinary spool valve.

Another aspect of the present invention is a construction of the actuator coils 38 in the valve of FIG. 1, and for that matter, their construction as it relates to systems using a plurality of solenoid actuated valves, including but not necessary limited to, valves of the specific type shown in FIG. 1. In particular, in some applications, it may be desirable to use printed coils (copper traces as in a printed circuit) for the actuator printed on the same printed circuit board as the coils for other actuators and/or on the same circuit board as electronic components used for such purposes as control of the actuator coils.

Figure 2:
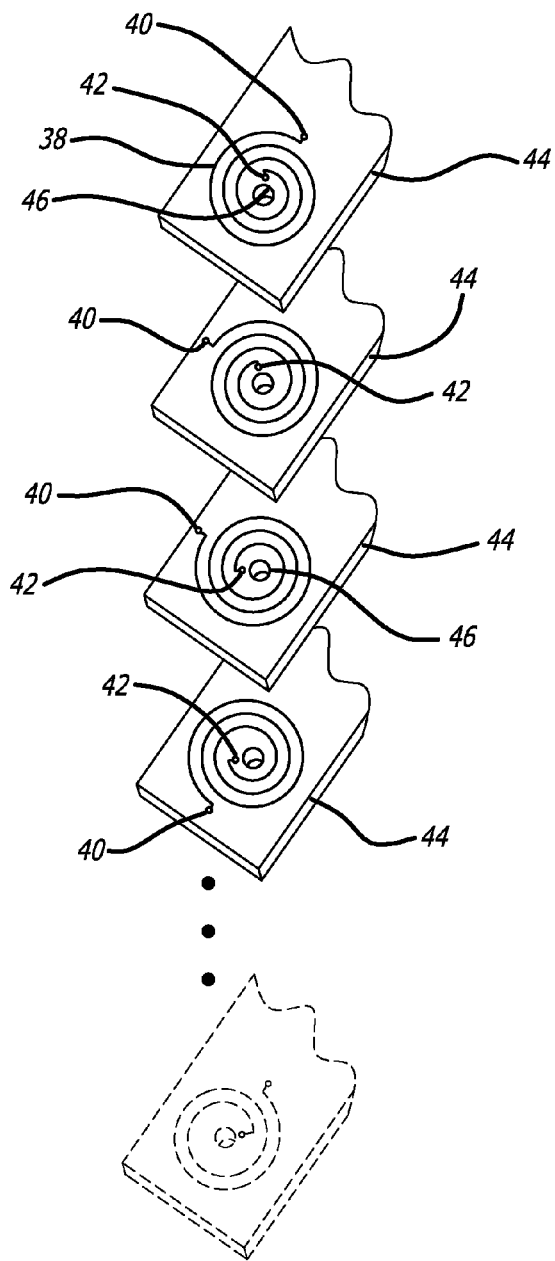
FIG. 2 is an exploded perspective view of a multilayer printed circuit board having printed coils on each layer of the board.

By way of specific example, an exploded view of a portion of a multi-layer printed circuit board can be seen in FIG. 2. As shown therein, in this embodiment, each printed coil 38 has first and second contacts 40 and 42. As may be seen in FIG. 2, alternate layers of the windings are printed in an opposite sense. Also, terminal 42 of an upper layer is aligned with terminal 42 of the next layer, though terminal 40 of that next layer is rotated 90° from terminal 40 of the upper layer. However, terminal 40 of the second layer is aligned with terminal 40 of the third layer, etc. Consequently, drilling through holes 90° apart and plating through the through holes will connect the coils of adjacent layers to provide a continuous coil of one winding sense through the multi-layer printed circuit board 44. Actually, the start connection on the upper layer and the finish connection on the lower layer must be offset from each other if they are to be brought out from the same layer to avoid connecting the end terminals of the resulting composite coil together. Thus terminal 40 on the upper layer and terminal 40 on the lower layer would be offset, typically circumferentially, from each other. With the specific configuration shown in FIG. 2, eight coil layers would be provided, with the four plated through hole pattern within the inner diameter of the individual coil being offset 45° from the hole pattern of contacts 40 outside the outer diameter of the individual coils.

The coils shown in FIG. 2 are shown as spirals, though as one alternative, each coil may be a circular arc of somewhat less than 360° stepping inward (or outward) radially to the next circular arc coil. Also, while plated through holes are used in a preferred embodiment to contact the coils in adjacent layers, other means of providing such inner connection may be used if desired. Further, while in the embodiment disclosed, the overall start and finish contacts for the final coil of interconnected windings are made available at the upper layer, such contacts may be brought out on the layer on which they occur, with contact made thereto at some other positions on the board away from the coils themselves. This avoids the need for angularly offsetting the start and finish connections.

FIG. 2 shows slightly over three turns per printed coil, for a total of 25 turns for eight layers of printed coils. This of course is schematic only, as the number of turns per layer and the number of layers used may be chosen as desired or required for a particular application. In applications for preferred embodiments of the invention, the spool poppet valves are fast acting, so while a high current pulse though the coil is used for actuation of the solenoid actuator, that pulse is of very short duration, and with quite a low duty cycle, so that coil heating may be kept relatively low. Also, if a holding current is used instead of magnetic latching, the holding current may be quite low because of the substantially zero air gap in the magnetic circuit when the solenoid actuator is actuated, so it causes very little coil heating. If desired or necessary for a particular application, high thermal conductivity printed circuit board materials are commercially available that could be used.

Figure 3:
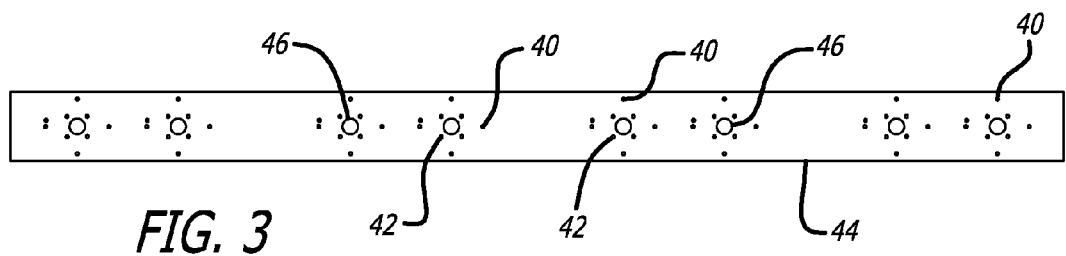
FIG. 3 is a face view of the multilayer printed circuit board of FIG. 2.
Figure 5:
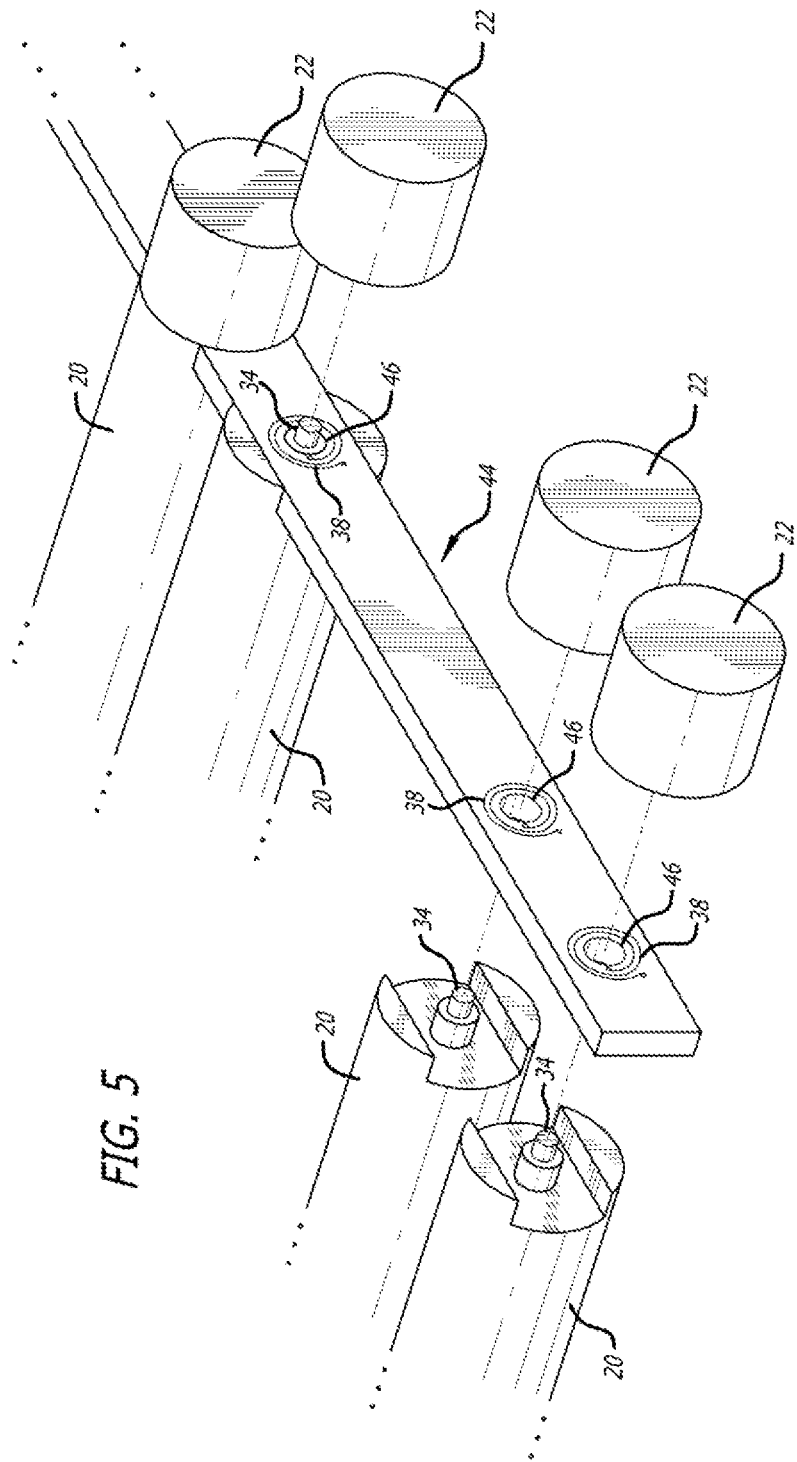
FIG. 5 illustrates how printed circuit board 40 extends beyond or out of the housing 20 and cap 22 in a direction perpendicular to the plane of the view of FIG. 1, so that the same multi-layer circuit board may provide solenoid coils for multiple solenoid actuated valves.

FIG. 3 shows a multi-layer board with eight or more layers having eight windings, each comprised of eight individual windings, such as is illustrated in FIG. 2. Thus, visible in FIG. 3 are the plated through holes 40 around the OD of each coil, as well as the plated through holes 42 around the ID of each printed coil. Also visible in FIG. 3, as well as FIG. 2, is a central hole 46 in each of the eight coils for the end 34 of the spool 26 for the embodiment of the spool poppet valve shown in FIG. 1. In that regard, the housing 20 and cap 22 shown in FIG. 1 may have a circular or rectangular outer surface, or other shapes as desired. However, printed circuit board 44 extends beyond or out of the housing 20 and cap 22 in a direction perpendicular to the plane of the view of FIG. 1, so that the same multi-layer circuit board may provide solenoid coils for multiple solenoid actuated valves as may be seen in FIG. 5, whether of the configuration of FIG. 1 or of other configurations and types. In that regard, if eight individual coils, as illustrated in FIG. 2, are used on an eight layer board, one coil layer, normally the top coil layer, would be exposed. Accordingly, depending on the overall configuration used, it may be necessary to insulate this layer from housing 20 or armature 28, which may be done in various ways, including the use of an insulator which may also serve as a seal to assure that any leakage past pressure balance pin 36 is exhausted through the vent and cannot leak out along the printed circuit board.

Figure 4:
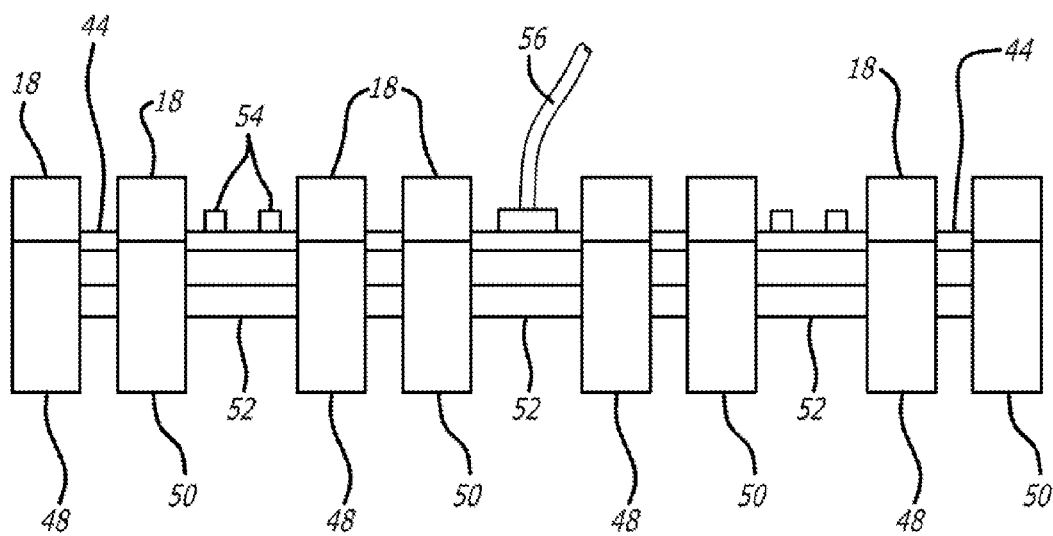
FIG. 4 is a schematic diagram of an exemplary application of the present invention.

An exemplary application of this embodiment of the present invention is schematically shown in FIG. 4. In this application, a hydraulic engine valve actuation system for a four-cylinder engine or for each bank of four cylinders of a V8 engine is schematically shown. Here, eight valves (as well as other components of the valve actuation system), such as valves 18 of FIG. 1, are shown, four for controlling hydraulic actuators 48 for engine intake valves, and four for controlling hydraulic valve actuators 50 for engine exhaust valves. Such an assembly, by way of example, may be provided on some interconnecting structure 52 for bolting to a engine head over the intake and exhaust valves with spring return, respectively. In that regard, hydraulic engine valve actuation systems and methods of operating such systems are known in the prior art. See, for instance, U.S. Pat. No. 6,739,293, which discloses a two-stage system, though single-stage systems wherein a solenoid actuated valve directly controls hydraulic fluid as applied to the hydraulic valve actuators are also known. In any event, in the system shown in FIG. 4, printed circuit board 44 spans all eight valves 18, and not only provides connections to the eight coils and the interconnection of layers making up each coil, but further provides printed circuit board space for various electronic components 54 to provide solenoid coil drivers, signal processing if engine valve position sensors are used, and various other tasks. Preferably in such an embodiment, a single cable 56 is used to provide power to the printed circuit board as well as such purposes as providing control signals to the board, and if sensors are used, sensor signals from the board. In that regard, preferably, communication to and from the board is through a serial bus, with the electronic components 54 on the printed circuit board 44 also including appropriate bus interfaces.

The advantage of an embodiment of the general type shown in FIG. 4 may be appreciated by recognizing that a multi-layer board in such applications is already required, so that the use of such a multi-layer board to achieve not only the multiple solenoid coils required in such a system, but to also make connections between the coils and the electronic circuits on the multi-layer board is achieved with little increase in cost.

The printed solenoid coil aspect of the present invention has been illustrated herein schematically. By way of example, FIG. 3 shows a multi-layer printed circuit board that has a rectangular planform and provision for eight actuator coils laid out in a linear array. Obviously in typical applications, the printed circuit board may not be rectangular, but may have regions of increased and decreased width, have holes for access to bolts there below, may have a larger or smaller number of printed solenoid coil layers and/or have printed solenoid coils that are not laid out in a linear array, depending on the specific application. By way of further example, each cylinder of a multiple cylinder engine, such as a diesel engine, may have one solenoid actuator for a valve controlling the engine intake valves, a second solenoid actuator for the engine exhaust valves and one or more additional solenoid actuators for controlling the fuel injector, all of which may be laid out on a printed circuit board, like printed circuit board 44, to provide the desired interconnection as well as electronics on the multi-layer printed circuit board. In that regard, the printed circuit board may or may not include a central control processor and associated memory, though if it does, cable 56 (FIG. 4) would still provide power and signal information at least to and perhaps from the printed circuit board, such as crankshaft angle, engine operating conditions and environmental conditions. Including the central control processor on the board can reduce costs by both taking full advantage of the multilayer board and by minimizing the communication needed to and from the board.

Thus the present invention has a number of aspects, which aspects may be practiced alone or in various combinations or sub-combinations, as desired. Also while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. An electromagnetic actuator comprising:
a stationary magnetic member;
a moveable magnetic member moveable from a first position to a second position in response to a magnetic field linking the stationary magnetic member and the moveable magnetic member;
an actuator coil disposed to cause a magnetic field linking the stationary magnetic member and the moveable magnetic member as a result of a current in the actuator coil;
the actuator coil being formed by the interconnection of conductive coils on each of multiple layers of a multiple layer printed circuit board, the multilayer printed circuit board having a stacked plurality of circuit boards, each with a printed coil thereon, the coils on the stacked plurality of circuit boards being interconnected by plated through holes in the plurality of circuit boards to form the actuator coil;
the stationary magnetic member and moveable magnetic member when in the second position, defining a magnetic circuit having a zero non-ferromagnetic gap.

2. The electromagnetic actuator of claim 1 wherein the multiple layer printed circuit board has an opening through the center of the actuator coil.

3. The electromagnetic actuator of claim 1 wherein the multiple layer printed circuit board includes at least one additional actuator coil formed by the interconnection of additional conductive coils on each of multiple layers for another electromagnetic actuator on the same printed circuit board.

4. The electromagnetic actuator of claim 3 further comprised of at least one electronic device associated with operation of a electromagnetic actuator mounted on the printed circuit board.

5. The electromagnetic actuator of claim 1 further comprised of at least one electronic device associated with operation of the electromagnetic actuator mounted on the printed circuit board.

6. The electromagnetic actuator of claim 1 wherein the multiple layer printed circuit board extends beyond the stationary magnetic member and includes at least one additional electromagnetic actuator thereon, each additional electromagnetic actuator having a stationary magnetic member, a moveable magnetic member moveable from a first position to a second position in response to a magnetic field linking the stationary magnetic member and the moveable magnetic member, an actuator coil disposed to cause a magnetic field linking the stationary magnetic member and the moveable magnetic member as a result of a current in the actuator coil, the actuator coil being formed by the interconnection of conductive coils on each of multiple layers of the multiple layer printed circuit board, the multilayer printed circuit board having a stacked plurality of circuit boards, each with a printed coil thereon, the coils on the stacked plurality of circuit boards being interconnected to form the actuator coil by plated through holes in the plurality of circuit boards, and for each additional actuator, the stationary magnetic member and moveable magnetic member when in the second position, defining a magnetic circuit having a zero non-ferromagnetic gap.

7. The electromagnetic actuator of claim 6 wherein the multiple layer printed circuit board has an opening through the center of each actuator coil.

8. The electromagnetic actuator of claim 7 further comprised of at least one electronic device associated with operation of a electromagnetic actuator mounted on the printed circuit board.

9. The electromagnetic actuator of claim 6 further comprised of at least one electronic device associated with operation of the electromagnetic actuator mounted on the printed circuit board.

* * * * *